(12) United States Patent
Kawamura (10) Patent No.: US 6,522,863 B2
(45) Date of Patent: Feb. 18, 2003

(54) MULTIPLE LISTENING TRAINING DEVICE AND A MULTIPLE LISTENING TRAINING RECORDING MEDIUM

(76) Inventor: Akihiro Kawamura, 405-8, Minami-iizuka, Oamishirasato-machi, Sanbu-gun, Chiba-ken (JP)

( * ) Notice: Subject to any disclaimer, the term of this patent is extended or adjusted under 35 U.S.C. 154(b) by 58 days.

(21) Appl. No.: 09/859,587

(22) Filed: May 18, 2001

(65) Prior Publication Data

US 2002/0009700 A1 Jan. 24, 2002

(30) Foreign Application Priority Data

May 18, 2000 (JP) ........................................ 2000-146123

(51) Int. Cl.⁷ .......................... G06F 17/00; G09B 19/00
(52) U.S. Cl. ....................................................... 434/308
(58) Field of Search ................................ 434/308, 309, 434/316, 318, 319

(56) References Cited

U.S. PATENT DOCUMENTS

| | | | | |
|---|---|---|---|---|
| 5,613,032 A | * | 3/1997 | Cruz et al. | 360/72.1 |
| 5,826,206 A | * | 10/1998 | Nemeth | 360/27 |
| 5,836,770 A | * | 11/1998 | Powers | 434/247 |
| 5,961,331 A | * | 10/1999 | Fisch | 434/219 |
| 6,027,428 A | * | 2/2000 | Thomas et al. | 434/319 |

FOREIGN PATENT DOCUMENTS

| | | | | |
|---|---|---|---|---|
| DE | 40 13 070 A1 | * | 10/1991 | ............ G09B/5/06 |
| JP | 05-137790 A | | 6/1993 | |
| JP | 10-133561 A | * | 5/1998 | ............ G09B/19/06 |
| JP | 10-269506 A | | 10/1998 | |

* cited by examiner

Primary Examiner—Hieu T. Vo
(74) Attorney, Agent, or Firm—Birch, Stewart, Kolasch & Birch, LLP (57) ABSTRACT

A multiple listening training device which is novel and suitable for a training simultaneous listening to a plurality of audio exercises or video/audio exercises. In the multiple listening training device, a plurality of audio exercises, the contents of which are different from each other, are prepared and stored as sound data. The device plays back via an audio playback device one turn of audio material comprising a first part playing back simultaneously k pieces of audio exercises, a second part playing back simultaneously m pieces of audio exercises and a third part playing back simultaneously n pieces of audio exercises and the first part, the second part and the third part being arranged by time series. Wherein, k, m, n are integers not less than 1 and k<n<m.

9 Claims, 4 Drawing Sheets

MULTIPLE LISTENING TRAINING DEVICE AND A MULTIPLE LISTENING TRAINING RECORDING MEDIUM

BACKGROUND OF THE INVENTION

1. Field of the Invention

This invention relates to a multiple listening training device, and more particularly, to a device which is suitable for training simultaneous listening to a plurality of audio exercises or video/audio exercises, the contents of which are different from each other, and a recording medium for multiple listening training suitable to be played back in such a device.

2. Related Art

To enhance the information processing ability of human, various kinds of learning materials, learning courses and training methods have been proposed.

An inventor of the present application has recognized plasticity of human brain and dedicated himself to a study thereof. As a result, he found that by adopting a specific training method which employs audio materials or image/audio materials, the information processing ability of the human brain, i.e., function of the brain for memorizing and learning can be efficiently enhanced. That is, it was found that while a plurality of audio exercises or video/audio exercises, the contents of which are different from each other, are played back in accordance with a specific procedure, a learner continues a training to listen to these contents in a bottom-up system, whereby the learner becomes able to simultaneously listen to two or more audio exercises or video/audio exercises.

SUMMARY OF THE INVENTION

Therefore, it is a feature of the present invention to provide a multiple listening training device which is novel and suitable for training simultaneous listening to a plurality of audio exercises or video/audio exercises, the contents of which are different from each other. It is another feature of the present invention to provide a recording medium which is particularly suitable to be played back in such a multiple listening training device.

To achieve the above-mentioned features, a multiple listening training device, consistent with the principles of the present invention, is provided by such a multiple listening training device, wherein a plurality of audio exercises, the contents of which are different from each other, are prepared and stored as sound data, playing back via an audio playback device one turn of audio material comprising a first part playing back simultaneously k pieces of audio exercises, a second part playing back simultaneously m pieces of audio exercises and a third part playing back simultaneously n pieces of audio exercises, the first part, the second part and the third part being arranged by time series (wherein k, m, n are integers not less than 1 and k<n<m).

According to the multiple listening training device having such a constitution, with respect to a learner, a stimulus of listening to the one turn of audio material comprising k pieces of audio exercises, m pieces of audio exercises and n pieces of audio exercises is conveyed to a human brain through his/her sense of hearing. By the training for multiple listening to the audio material having a specific pattern comprising k pieces of audio exercises (weak stimulus or light learning load), m pieces of audio exercises (strong stimulus or heavy learning load) and n pieces of audio exercises (medium stimulus or medium learning load), the human brain gradually becomes able to listen to n pieces of audio exercises (wherein n>k and n is an integer not less than 1) whereas only k pieces (wherein k is an integer not less than 1) of audio exercises can be initially listened to. Such a brain function is called "plasticity of brain" or "synapse plasticity" which means that new nervous circuit pertinent to memorizing and learning of the audio exercises is formed, when a signal having the strength equal to or more than a fixed threshold value is input. The multiple listening training device consistent with the principles of the present invention, which employs the specific pattern comprising k pieces of audio exercises (weak stimulus or light learning load), m pieces of audio exercises (strong stimulus or heavy learning load) and n pieces of audio exercises (medium stimulus or medium learning load), makes it go possible to raise the level in which the learner can simultaneously listen to only k pieces of audio exercises, to the level in which the learner can simultaneously listen to n pieces of audio exercises by the training in the bottom-up system.

A multiple listening training device, is provided by such a multiple listening training device, wherein: a first turn of audio material comprising the first part playing back simultaneously k pieces of audio exercises, the second part playing back simultaneously m pieces of audio exercises and the third part playing back simultaneously n pieces of audio exercises; a second turn of audio material comprising a first part playing back simultaneously (k+1) pieces of audio exercises, a second part playing back simultaneously (m+1) pieces of audio exercises and a third part playing back simultaneously (n+1) pieces of audio exercises; a pth (p is an integer not less than 3) turn of audio material comprising a first part playing back simultaneously (k+p−1) pieces of audio exercises, a second part playing back simultaneously (m+p−1) pieces of audio exercises and a third part playing back simultaneously (n+p−1) pieces of audio exercises, and the first turn to the pth turn are constituted so as to be played back corresponding to the rise of the learning level of a learner. Hereby, the level of the simultaneous listening ability of the learner can be sequentially raised from two pieces of audio exercises to three pieces of audio exercises, and further to the more number of audio exercises corresponding to the progress of learning of the learner.

A multiple listening training device, consistent with the principles of the present invention, is provided by such a multiple listening training device, wherein a plurality of video/audio exercises, the contents of which are different from each other, are prepared and stored as image/sound data, playing back via a video/audio playback device one turn of video/audio material comprising, a first part playing back simultaneously k pieces of video/audio exercises, a second part playing back simultaneously m pieces of video/audio exercises and a third part playing back simultaneously n pieces of video/audio exercises, the first part, the second part and the third part being arranged by time series (wherein k, m, n are integers not less than 1 and k<n<m).

Thus constituted, since image and sound are simultaneously played back, the stimuli can be simultaneously conveyed to the human brain through the senses of sight and hearing. Accordingly, the stimulus for increasing the plasticity of the brain is intensified and the efficiency of the multiple listening training can also be enhanced.

Sound and image are simultaneously played back, similar to the aforementioned case where the sound only is played back, in the multiple listening training device consistent with the principles of the present invention provided by such a multiple listening training device, wherein: a first turn of image/audio material comprising the first part playing back simultaneously k pieces of video/audio exercises, the second part playing back simultaneously m pieces of video/audio exercises and the third part playing back simultaneously n pieces of video/audio exercises, a second turn of image/audio material comprising a first part playing back simultaneously (k+1) pieces of video/audio exercises, a second part playing back simultaneously (m+1) pieces of video/audio exercises and a third part playing back simultaneously (n+1) pieces of video/audio exercises, a pth (p is an integer not less than 3) turn of image/audio material comprising a first part playing back simultaneously (k+p−1) pieces of video/audio exercises, a second part playing back simultaneously (m+p−1) pieces of video/audio exercises and a third part playing back simultaneously (n+p−1) pieces of video/audio exercises, and the first turn to the pth turn are constituted so as to be played back corresponding to the rise of the learning level of a learner.

A material suitable for the multiple listening training device consistent with the principles of the present invention may be provided as a multiple listening training recording medium, wherein a plurality of audio exercises, the contents of which are different from each other, are prepared, one turn of audio material comprising a first part playing back simultaneously k pieces of audio exercises, a second part playing back simultaneously m pieces of audio exercises and a third part playing back simultaneously n pieces of audio exercises, the first part, the second part and the third part being arranged in time series, is recorded so as to be played back via an audio playback device (wherein k, m, n are integers not less than 1 and k<n<m).

Such a multiple listening training recording medium may be a multiple listening training recording medium, wherein: a first turn of audio material comprising the first part playing back simultaneously k pieces of audio exercises, the second part playing back simultaneously m pieces of audio exercises and the third part playing back simultaneously n pieces of audio exercises, a second turn of audio material comprising a first part playing back simultaneously (k+1) pieces of audio exercises, a second part playing back simultaneously (m+1) pieces of audio exercises and a third part playing back simultaneously (n+1) pieces of audio exercises, a pth (p is an integer not less than 3) turn of audio material comprising a first part playing back simultaneously (k+p−1) pieces of audio exercises, a second part playing back simultaneously (m+p−1) pieces of audio exercises and a third part playing back simultaneously (n+p−1) pieces of audio exercises, the first part, ant the second part and the third part being arranged by time series, and the first turn to the pth turn are recorded separately corresponding to the learning level of a learner.

To play back image and sound simultaneously, a multiple listening training recording medium may be a multiple listening training recording medium, wherein a plurality of video/audio exercises, the contents of which are different from each other, are prepared, one turn of image/audio material comprising a first part playing back simultaneously k pieces of video/audio exercises, a second part playing back simultaneously m pieces of video/audio exercises and a third part playing back simultaneously n pieces of video/audio exercises, the first part, the second second part and the third part being arranged by time series, is recorded so as to be played back via an audio playback device (wherein k, m, n are integers not less than 1 and k<n<m).

Alternatively, a multiple listening training device may a multiple listening training recording medium, wherein: a first turn of image/audio material comprising the first part playing back simultaneously k pieces of video/audio exercises, the second part playing back simultaneously m pieces of video/audio exercises and the third part playing back simultaneously n pieces of video/audio exercises, a second turn of image/audio material comprising a first part playing back simultaneously (k+1) pieces of video/audio exercises, a second part playing back simultaneously (m+1) pieces of video/audio exercises and a third part playing back simultaneously (n+1) pieces of video/audio exercises, a pth (p is an integer not less than 3) turn of image/audio material comprises a first part playing back simultaneously (k+p−1) pieces of video/audio exercises, a second part playing back simultaneously (m+p−1) pieces of video/audio exercises and a third part playing back simultaneously (n+p−1) pieces of video/audio exercises, and the first turn to the pth turn are recorded separately corresponding to the learning level of a learner.

As the multiple listening training recording mediums, a magnetic tape, a compact disc, a CD-ROM, a CD-R and the like can be used for containing image and sound that is played back by an audio player, video/audio player, or a computer.

BRIEF DESCRIPTION OF THE DRAWINGS

The invention will be explained in more detail in conjunction with appended drawings, wherein.

DETAILED DESCRIPTION

Reference will now be made in detail to the features of the principles of the present invention, examples of which are illustrated in the accompanying drawings.

Hereinafter, such a case where image and sound are simultaneously played back is referred to as an example.

Figure 1:
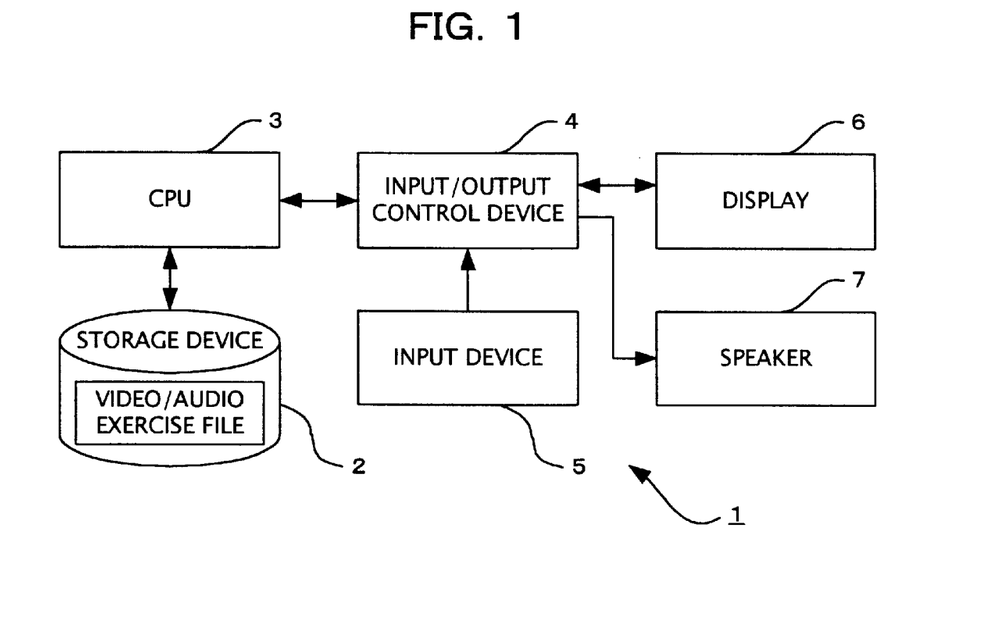
FIG. 1 is a view showing a constitution of a multiple listening training device according to an exemplary embodiment consistent with the principles of the present invention.
Figure 2:
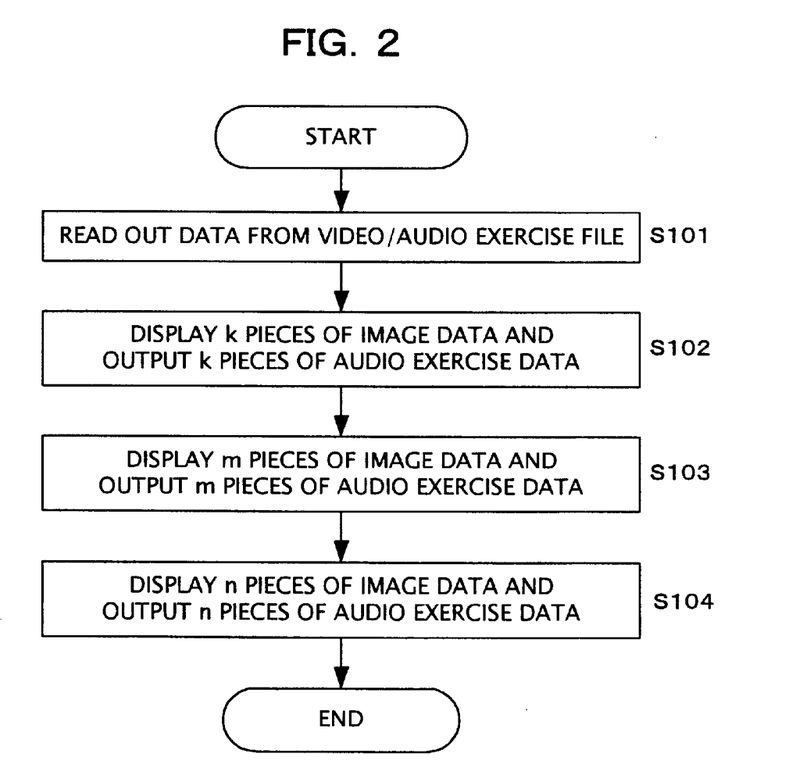
FIG. 2 is an exemplary flow chart illustrating an operation of the multiple listening training device shown in FIG. 1.

FIG. 1 shows an overall constitution of a multiple listening training device according to an exemplary embodiment consistent with the principles of the present invention and FIG. 2 shows an exemplary flow of an operation of the multiple listening training device. The multiple listening training device 1 is provided with at least a storage device 2 for preparing and storing a video/audio exercise file, a central processing unit (CPU) 3, an input/output control device 4, an input device 5, a display 6 for displaying image data and a speaker 7 for outputting audio exercise data.

The storage device 2 prepares and stores m pieces of video/audio exercise files, the contents of which are different from each other. Each video/audio exercise file comprises image data and audio exercise data. Such a video/audio exercise file can be prepared in accordance with the animation format which is widely utilized at the present time. The storage device 2 is a recording medium such as a CD-ROM, for example. The CPU 3, via a reading device (not shown), controls readout of a predetermined number of video/audio exercise files at a predetermined timing (S101).

The input/output control device 4, in response to the predetermined program read into a main storage device (not shown) and a command input from the input device 5, controls the CPU 3 so as to constitute one turn of image/audio material, from among m pieces of video/audio exercise files, comprising a first part playing back simultaneously k pieces of video/audio exercises, a second part playing back simultaneously m pieces of video/audio exercises, and a third part playing back simultaneously n pieces of video/audio exercises, the first part, the second part and third part being arranged by time series. A keyboard and a mouse are used as the input device 5 which may be constituted so as to give instructions to learners based on a predetermined GUI (Graphical User Interface) cooperatively with the display 6.

The control of playing back the image/audio material by the input/output control device 4 is performed in a manner described below. A start button (not shown) displayed on the display 6 is pushed by operating the input device 5. Whereat, the input/output control device 4 receives a start command from the input device 5 and starts playing back one turn of image/audio material. First of all, the input/output control device 4 plays back the first part of the one turn of image/audio material. At the same time, for a fixed period, the display 6 simultaneously displays k pieces of image data and the speaker 7 simultaneously outputs k pieces of audio exercise data (S102). Following the playback of the first part, the input/output control device 4 plays back the second part. At the same time, for a fixed period, the display 6 simultaneously displays m pieces of image data and the speaker 7 simultaneously outputs m pieces of audio exercise data (S103). Following the playback of the second part, the input/output control device 4 plays back the third part. At the same time, the display 6 simultaneously displays n pieces of image data and the speaker 7 simultaneously outputs n pieces of audio exercise data (S104). In this embodiment, k, m, n are integers not less than 1 and k<n<m. The image data and the audio exercise data are synchronized while any part is playing back.

Figure 3:
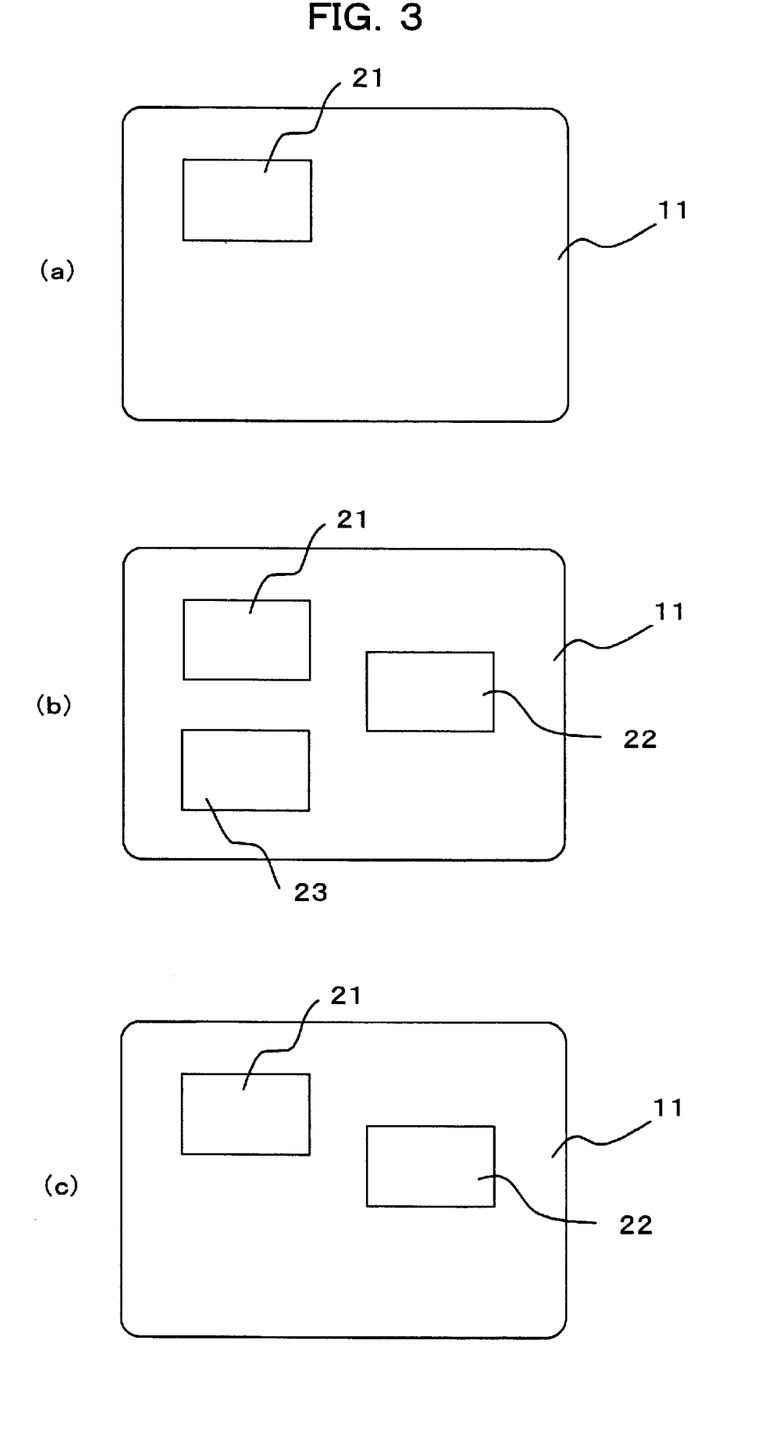
FIG. 3 is a view showing an example of a display screen on a display consistent with the principles of the present invention.

FIG. 3 shows an example where image data is displayed on a display screen 11 of the display 6 in the multiple listening training device according to the first embodiment shown in FIG. 1. Such a case where k=1, m=3 and n=2 is shown here as the most basic example. At the setout, the display of the image data starts with one piece of image window 21 shown in FIG. 3(a), and subsequently three pieces of image windows 21, 22 and 23 shown in FIG. 3(b) follow, and then two pieces of image windows 21 and 22 shown in FIG. 3(c) follow, where the display of one turn of material is finished. Needless to say, while the image data is displayed on each image window, the audio exercise data corresponding thereto is output synchronously from the speaker 7.

Figure 4:
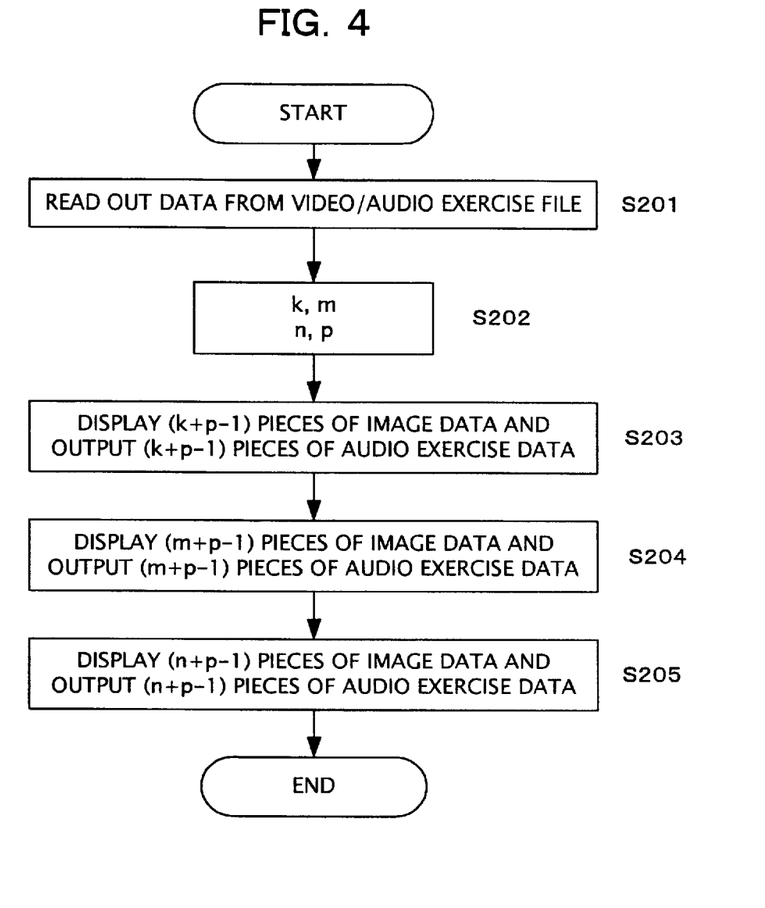
FIG. 4 is a flow chart illustrating an operation of a multiple listening training device according to another exemplary embodiment consistent with the principles of the present invention.

FIG. 4 shows an example of an operation of a multiple listening training device according to the second embodiment. The flow of the operation shown in FIG. 2 is further extended and such a case where image/audio material from the first turn to the pth turn is constituted so as to be played back corresponding to the rise of the learning level of the learner. In this embodiment, the storage device 2 is assumed to prepare and store at least (m+p−1) pieces of video/audio exercise files.

The CPU 3, via a reading device (not shown), controls readout of the predetermined number of video/audio exercise files at a predetermined timing (S201).

The learner can arbitrarily set the initial value p corresponding to his/her learning level (S202). An input device 5 such as a keyboard, a mouse or the like may be constituted so as to operate the setting of the initial value p on a display. To play back the first turn of image/audio material, k=1, m=3, n=2, and p=1 should be set as the initial values.

In the multiple listening training device according to this exemplary embodiment, the control of playing back the image/audio material by the input/output control device 4 is performed in a manner described below. A start button displayed on the display 6 (not shown) is pushed by operating the input device 5. Whereat, the input/output control device 4 receives a start command from the input device 5 and starts playing back the pth turn of image/audio material. First of all, the input/output control device 4 plays back the first part out of the pth turn of image/audio material. At the same time, for a fixed period, the display 6 simultaneously displays (k+p−1) pieces of image data and the speaker 7 simultaneously outputs (k+p−1) pieces of audio exercise data (S203). Following the playback of the first part, the input/output control device 4 plays back the second part. At the same time, for a fixed period, the display 6 simultaneously displays (m+p−1) pieces of image data and the speaker 7 simultaneously outputs (m+p−1) pieces of audio exercise data (S204). Following the playback of the second part, the input/output control device 4 plays back the third part. At the same time, the display 6 simultaneously displays (n+p−1) pieces of image data and the speaker 7 simultaneously outputs (n+p−1) pieces of audio exercise data (S205). In this exemplary embodiment, k, m, n are integers not less than 1 and k<n<m. The image data and the audio exercise data are synchronized while any part is playing back, similarly to the first embodiment described above.

Figure 5:
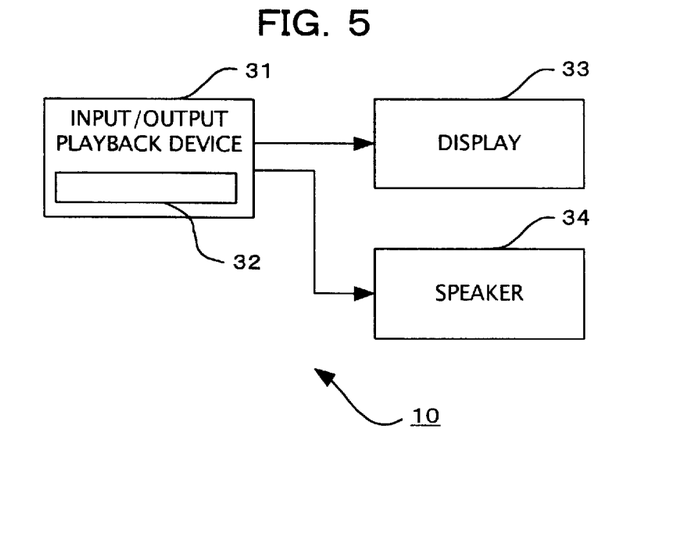
FIG. 5 is a view showing a constitution of a multiple listening training device according to another exemplary embodiment consistent with the principles of the present invention.
Figure 6:
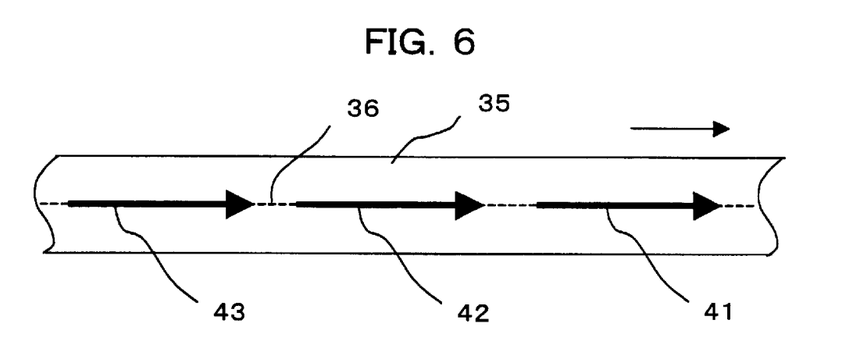
FIG. 6 is a conceptual view showing an example where video/audio signals are recorded on a recording medium which is played back in the multiple listening training device shown in FIG. 5.

A multiple listening training device according to another exemplary embodiment is now explained referring to FIGS. 5 and 6.

As shown in FIG. 5, the multiple listening training device 10 according to this embodiment is provided with a video/audio playback device 31, a display 33 and a speaker 34. The video/audio playback device 31 has an insert slot 32 for inserting a recording medium such as a cartridge housing a video tape in which video/audio signals are prepared and stored so as to enable a predetermined playback of the video/audio exercises necessary for carrying out the present invention.

FIG. 6 is a conceptual view showing a case where the image/voice signals are recorded on the video tape 35. A plurality of video/audio exercises, the contents of which are different from each other, are prepared. One turn of image/audio material, comprising an video/audio signal 41 corresponding to a first part playing back simultaneously k pieces of video/audio exercises, an video/audio signal 42 corresponding to a second part playing back simultaneously m pieces of video/audio exercises and a video/audio signal 43 corresponding to a third part playing back simultaneously n pieces of video/audio exercises, each audio signal being arranged by time series, is recorded along a video/audio track 36. In this embodiment, k, m, n are integers not less than 1 and k<n<m.

Accordingly, the first part, the second part and the third part can be sequentially played back by the video/audio playback device 31.

The video signals to be recorded on the video tape 35 can be recorded on a single video track, for example, by making the screen displays shown in FIGS. 3(a), (b) and (c) respectively correspond to the image signals of the first part, the image signals of the second part and the image signals of the third part. On the other hand, with respect to the audio signals, the audio signals of the audio exercises which is simultaneously played back at the first part, the second part and the third part respectively, can be recorded on a single audio track. It is needless to say that using an video/audio playback device which is capable of playing back multiple audio tracks, the audio signals of the audio exercises can be recorded in separate tracks.

Succession of comprising the first turn of video/audio material, the second turn of the image/audio material may comprise a first part playing back simultaneously (k+1) pieces of video/audio exercises, a second part playing back simultaneously (m+1) pieces of video/audio exercises and a third part playing back simultaneously (n+1) pieces of video/audio exercises. Thereafter, in the same manner, a pth (p is an integer not less than 3) turn of image/audio material may comprise a first part playing back simultaneously (k+p−1) pieces of video/audio exercises, a second part playing back simultaneously (m+p−1) pieces of video/audio exercises and a third part playing back simultaneously (n+p−1) pieces of video/audio exercises. Each turn may be recorded on a certain part of the video tape 35 so that by merely preparing one video tape 35 as the material, the learner can suitably select to play back one turn from among the first turn to the pth turn corresponding to his/her own learning level. Therefore, the training, in which the learner challenges and learns more difficult video/audio exercises while trying to raise the level, becomes possible.

Figure 7:
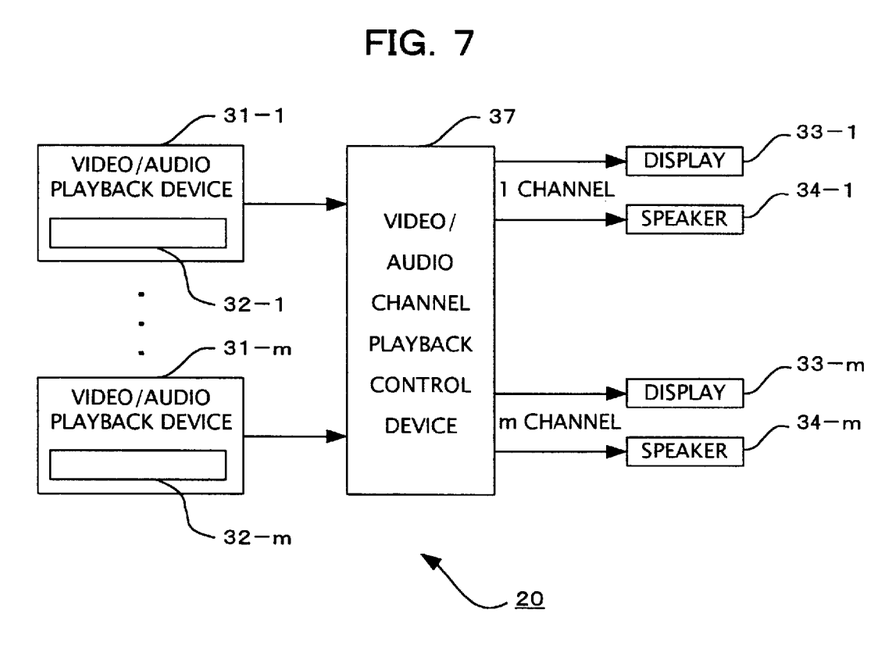
FIG. 7 is a view showing a constitution of a multiple listening training device according to another exemplary embodiment consistent with the principles of the present invention.

FIG. 7 shows a multiple listening training device according to another exemplary embodiment. The multiple listening training device 20 is provided with m pieces of video/audio playback devices 31-1 to 31-m, m pieces of displays 33-1 to 33-m, m pieces of speakers 34-1 to 34-m and a video/audio channel playback control device 37.

Respective video/audio playback devices 31-1 to 31-m have insertion slots 32-1 to 31-m for inserting a cartridge housing a video tape in which video/audio signals of video/audio exercises, the contents of which are different from each other.

The video/audio channel playback control device 37 can control playing back and pausing each video/audio playback devices 31-1 to 31-m, respectively. It deals with the video/audio signals output from the video/audio playback device which is in a flow of the playback as one output channel signal of video/audio exercise, and then outputs the signal to one set of a display and a speaker. In this embodiment, in maximum m pieces of video/audio exercises can be output so that m pieces of the displays display images and m pieces of the speakers playback sounds.

The operation of the multiple listening training device according to this embodiment is described below. The video/audio channel playback control device 37 starts playing back the one turn of video/audio material. First of all, the video/audio channel playback control device 37 makes k pieces of video/audio playback devices 31-1 to 31-k start playing back, and then plays back the first part of one turn of image/audio material. At the same time, for a fixed period, the displays 33-1 to 33-k simultaneously display image data respectively, and the speakers 34-1 to 34-k simultaneously output audio exercise data respectively. When playing back the first part is finished, k pieces of video/audio playback devices 31-1 to 31-k are paused. Following the playback of the first part, the video/audio channel playback control device 37 plays back the second part. That is, the video/audio channel playback control device 37 makes m pieces of video/audio playback devices 31-1 to 31-m start playing back, and then plays back the second part of one turn of image/audio material. At the same time, for a fixed period, the displays 33-1 to 33-m simultaneously display image data respectively and the speakers 34-1 to 34-m simultaneously output audio exercise data respectively. When playing back the second part is finished, m pieces of video/audio playback devices 31-1 to 31-m are paused. Following the play back of the second part, the video/audio channel playback control device 37 plays back the third part. At the same time, for a fixed period, the displays 33-1 to 33-n simultaneously display image data respectively and the speakers 34-1 to 34-n simultaneously output audio exercise data respectively. In this embodiment, k, m, n are integers of not less than 1 and k<n<m.

As can be clearly understood from the operation of the multiple listening training device according to the fourth embodiment described above, it is needless to say that it becomes possible to constitute and play back more advanced turn which comprises yet more video/audio exercises by controlling the operation of the video/audio channel playback control device 37 in accordance with a predetermined program. That is, as in the case of the multiple listening training device according to the second exemplary embodiment described above, the first turn to the pth turn of video/audio materials can be constituted to be played back corresponding to the rise of the learning level of the learner.

Whereas the cases where the video/audio exercises are played back have been described as examples in the previous exemplary embodiments, it is needless to say that the features of the present invention can be achieved in a case where the audio exercises excluding the image data are played back. Wherein, such components, which are necessary for display and playback of the image data such as the display or the like included in the multiple listening training device, can be omitted. Further, the materials which are used in the multiple listening training device can be provided in a form of an audio tape, a CD, a CD-ROM or the like for containing sound signals (data), the format of which are suitable for playing back the audio exercises in a system consistent with the principles of the present invention.

As mentioned above, the multiple listening training device consistent with the principles of the present invention, wherein a plurality of audio exercises, the contents of which are different from each other, are prepared and stored as the sound data, is constituted so as to play back via the audio playback device one turn of audio material comprising the first part playing back simultaneously k pieces of audio exercises, the second part playing back simultaneously m pieces of audio exercises and the third part playing back simultaneously n pieces of audio exercises, the first part, the second part and the third part being arranged by time series. Accordingly, the specific pattern comprises k pieces of audio exercises (weak stimulus or light learning load), m pieces of audio exercises (strong stimulus or heavy learning load) and n pieces of audio exercises (medium stimulus or medium learning load), thereby the training based on the bottom-up system makes it possible to raise the level in which the learner can simultaneously listen to only k pieces of audio exercises to the level in which the learner can simultaneously listen to n pieces of audio exercises. The multiple listening training device consistent with the principles of the present invention greatly contributes to the enhancement of the plasticity of the human brain and also the substantial enhancement of the information processing ability (memorizing/learning ability) of learners.

The exemplary embodiments of the present invention have been disclosed by way of example and it will be understood that other modifications may occur to those skilled in the art without departing from the scope and the spirit of the appended claims.

What is claimed is:

1. A multiple listening training device, wherein a plurality of audio exercises, the contents of which are different from each other, are prepared and stored as sound data,
    playing back via an audio playback device one turn of audio material comprising,
    a first part playing back simultaneously k pieces of audio exercises, a second part playing back simultaneously m pieces of audio exercises and a third part playing back simultaneously n pieces of audio exercises, the first part, the second part and the third part being arranged by time series (wherein k, m, n are integers not less than 1 and k<n<m).

2. The multiple listening training device according to claim 1, wherein:
    a first turn of audio material comprising the first part playing back simultaneously k pieces of audio exercises, the second part playing back simultaneously m pieces of audio exercises and the third part playing back simultaneously n pieces of audio exercises;
    a second turn of audio material comprising a first part playing back simultaneously (k+1) pieces of audio exercises, a second part playing back simultaneously (m+1) pieces of audio exercises and a third part playing back simultaneously (n+1) pieces of audio exercises;
    a pth (p is an integer not less than 3) turn of audio material comprising a first part playing back simultaneously (k+p−1) pieces of audio exercises, a second part playing back simultaneously (m+p−1) pieces of audio exercises and a third part playing back simultaneously (n+p−1) pieces of audio exercises, and
    the first turn to the pth turn are constituted so as to be played back corresponding to the rise of the learning level of a learner.

3. A multiple listening training device, wherein a plurality of video/audio exercises, the contents of which are different from each other, are prepared and stored as image/sound data,
    playing back via a video/audio playback device one turn of video/audio material comprising,
    a first part playing back simultaneously k pieces of video/audio exercises, a second part playing back simultaneously m pieces of video/audio exercises and a third part playing back simultaneously n pieces of video/audio exercises, the first part, the second part and the third part being arranged by time series (wherein k, m, n are integers not less than 1 and k<n<m).

4. The multiple listening training device according to claim 3, wherein:
    a first turn of image/audio material comprising the first part playing back simultaneously k pieces of video/audio exercises, the second part playing back simultaneously m pieces of video/audio exercises and the third part playing back simultaneously n pieces of video/audio exercises,
    a second turn of image/audio material comprising a first part playing back simultaneously (k+1) pieces of video/audio exercises, a second part playing back simultaneously (m+1) pieces of video/audio exercises and a third part playing back simultaneously (n+1) pieces of video/audio exercises,
    a pth (p is an integer not less than 3) turn of image/audio material comprising a first part playing back simultaneously (k+p−1) pieces of video/audio exercises, a second part playing back simultaneously (m+p−1) pieces of video/audio exercises and a third part playing back simultaneously (n+p−1) pieces of video/audio exercises, and
    the first turn to the pth turn are constituted so as to be played back corresponding to the rise of the learning level of a learner.

5. A multiple listening training recording medium, wherein a plurality of audio exercises, the contents of which are different from each other, are prepared,
    one turn of audio material comprising a first part playing back simultaneously k pieces of audio exercises, a second part playing back simultaneously m pieces of audio exercises and a third part playing back simultaneously n pieces of audio exercises, the first part, the second part and the third part being arranged in time series, is recorded so as to be played back via an audio playback device
(wherein k, m, n are integers not less than 1 and k<n<m).

6. The multiple listening training recording medium according to claim 5, wherein:
    a first turn of audio material comprising the first part playing back simultaneously k pieces of audio exercises, the second part playing back simultaneously m pieces of audio exercises and the third part playing back simultaneously n pieces of audio exercises,
    a second turn of audio material comprising a first part playing back simultaneously (k+1) pieces of audio exercises, a second part playing back simultaneously (m+1) pieces of audio exercises and a third part playing back simultaneously (n+1) pieces of audio exercises,
    a pth (p is an integer not less than 3) turn of audio material comprising a first part playing back simultaneously (k+p−1) pieces of audio exercises, a second part playing back simultaneously (m+p−1) pieces of audio exercises and a third part playing back simultaneously (n+p−1) pieces of audio exercises, the first part, and the second part and the third part being arranged by time series, and
    the first turn to the pth turn are recorded separately corresponding to the learning level of a learner.

7. A multiple listening training recording medium, wherein a plurality of video/audio exercises, the contents of which are different from each other, are prepared,
    one turn of image/audio material comprising a first part playing back simultaneously k pieces of video/audio exercises, a second part playing back simultaneously m pieces of video/audio exercises and a third part playing back simultaneously n pieces of video/audio exercises, the first part, the second part and the third part being arranged by time series, is recorded so as to be played back via an audio playback device (wherein k, m, n are integers not less than 1 and k<n<m).

8. The multiple listening training recording medium according to claim 7, wherein:
- a first turn of image/audio material comprising the first part playing back simultaneously k pieces of video/audio exercises, the second part playing back simultaneously m pieces of video/audio exercises and the third part playing back simultaneously n pieces of video/audio exercises,
- a second turn of image/audio material comprising a first part playing back simultaneously (k+1) pieces of video/audio exercises, a second part playing back simultaneously (m+1) pieces of video/audio exercises and a third part playing back simultaneously (n+1) pieces of video/audio exercises,
- a pth (p is an integer not less than 3) turn of image/audio material comprises a first part playing back simultaneously (k+p−1) pieces of video/audio exercises, a second part playing back simultaneously (m+p−1) pieces of video/audio exercises and a third part playing back simultaneously (n+p−1) pieces of video/audio exercises, and
- the first turn to the pth turn are recorded separately corresponding to the learning level of a learner.

9. The multiple listening training recording medium according to claims 5, 6, 7 or 8, wherein the recording medium is a recording medium including one of a magnetic tape, a compact disc, a CD-ROM, and a CD-R for containing the audio or video/audio material that is played back by one of an audio player, a video/audio player, and a computer.

* * * * *

UNITED STATES PATENT AND TRADEMARK OFFICE
CERTIFICATE OF CORRECTION

PATENT NO. : 6,522,863 B2
DATED : February 18, 2003
INVENTOR(S) : Akihiro Kawamura It is certified that error appears in the above-identified patent and that said Letters Patent is hereby corrected as shown below:

<u>Title page,</u>
Item [76], please change:

"[76] Inventor: Akihiro Kawamura, 405-8, Minami-iizuka, Oamishirasato-machi, Sanbu-gun, Chiba-ken (JP)"

to the following:

-- [76] Inventor: Akihiro Kawamura, 5-3-10-102, Yashio, Shinagawa-ku, Tokyo (JP) --

Signed and Sealed this

Thirteenth Day of January, 2004

JON W. DUDAS
*Acting Director of the United States Patent and Trademark Office*